(12) United States Patent
Hafellner et al.

(10) Patent No.: US 12,253,625 B2
(45) Date of Patent: Mar. 18, 2025

(54) VEHICLE TARGET WITH PANELS FOR AVOIDING RADAR REFLECTIONS INSIDE THE CAR TARGET

(71) Applicant: 4ACTIVESYSTEMS GMBH, Traboch (AT)

(72) Inventors: Reinhard Hafellner, Spielberg (AT); Martin Fritz, Kobenz (AT)

(73) Assignee: 4ACTIVESYSTEMS GMBH, Traboch (AT)

(*) Notice: Subject to any disclaimer, the term of this patent is extended or adjusted under 35 U.S.C. 154(b) by 630 days.

(21) Appl. No.: 17/434,742

(22) PCT Filed: Mar. 2, 2020

(86) PCT No.: PCT/EP2020/055470
§ 371 (c)(1),
(2) Date: Aug. 28, 2021

(87) PCT Pub. No.: WO2020/178252
PCT Pub. Date: Sep. 10, 2020

(65) Prior Publication Data
US 2022/0128653 A1 Apr. 28, 2022

Related U.S. Application Data

(60) Provisional application No. 62/813,316, filed on Mar. 4, 2019.

(51) Int. Cl.
*G01S 7/40* (2006.01)
*G01S 13/931* (2020.01)

(52) U.S. Cl.
CPC .............. *G01S 7/40* (2013.01); *G01S 13/931* (2013.01)

(58) Field of Classification Search
CPC ................................. G01S 7/40; G01S 13/931
See application file for complete search history.

(56) References Cited

U.S. PATENT DOCUMENTS

| 5,652,375 A | 7/1997 | Da Re' |
| 9,355,576 B2 | 5/2016 | Fritz |

(Continued)

FOREIGN PATENT DOCUMENTS

| CN | 102826229 A | 9/2012 |
| CN | 105035002 A | 11/2015 |

(Continued)

OTHER PUBLICATIONS

AB Dynamics, Soft Car 360—the Euro NCAP Global Vehicle Target (GVT) for 2018, https://www.youtube.com/watch?v=zomGMzhkdrA, Apr. 20, 2017 (Year: 2017).*

(Continued)

*Primary Examiner* — Timothy A Brainard
*Assistant Examiner* — Helena H Seraydaryan
(74) *Attorney, Agent, or Firm* — Robert A. Blaha; Smith Tempel Blaha LLC (57) ABSTRACT

There is described a vehicle target for testing sensors of vehicle driver assistant systems. The vehicle target comprises an outer skin defining the outer geometry of the vehicle target, wherein the outer skin at least partially surrounds an inner volume. The vehicle target further comprises at least one panel comprising a basic body and a radar absorbing or reflecting layer attached to the basic body, wherein the panel is mounted to the outer skin such that at least the radar absorbing or reflecting material/layer has an offset with respect to the outer skin in the direction to the inner volume.

15 Claims, 6 Drawing Sheets

(56) References Cited

U.S. PATENT DOCUMENTS

| | | |
|---|---|---|
| 9,870,722 B2 | 1/2018 | Fritz et al. |
| 10,352,826 B2 | 7/2019 | Fritz et al. |
| 10,955,313 B2 | 3/2021 | Hafellner et al. |
| 11,092,515 B2 | 8/2021 | Hafellner et al. |
| 11,125,651 B2 | 9/2021 | Hafellner et al. |
| 2013/0017346 A1 | 1/2013 | Kelly et al. |
| 2014/0102224 A1 | 4/2014 | Fritz |
| 2015/0317917 A1 | 11/2015 | Fritz et al. |
| 2016/0054199 A1 | 2/2016 | Fritz et al. |
| 2017/0315022 A1 | 11/2017 | Simader et al. |
| 2018/0010984 A1* | 1/2018 | Silberling ............... G06G 7/78 |
| 2018/0306676 A1 | 10/2018 | Wimmer |
| 2019/0219486 A1 | 7/2019 | Hafellner et al. |
| 2019/0257717 A1* | 8/2019 | Hafellner .......... G01M 17/0078 |
| 2020/0003658 A1 | 1/2020 | Hafellner et al. |

FOREIGN PATENT DOCUMENTS

| | | | |
|---|---|---|---|
| EP | 3242120 | 8/2017 | |
| JP | H08511626 A | 12/1996 | |
| JP | H10335880 A | 12/1998 | |
| WO | WO-2018007459 A1 * | 1/2018 | ........ G01M 17/0078 |

OTHER PUBLICATIONS

Forkenbrock "A Test Track Comparison of the Global Vehicle Target and NHTSA's Strikeable Surrogate Vehicle", Jul. 2019 (Year: 2019).*

International Search Report for PCT/EPO2020/055470; Mar. 25, 2020.

Google Patents; English language translation of EP3242120 cited in International Search Report.

European Patent Office; machine translation of EP3242120 cited in International Search Report.

WIPO EPO/ISA, Written Opinion of the International Searching Authority, May 2020.

Decision of Refusal in Japanese Patent Application No. 2021-534371; pp. 1-2; Mar. 27, 2024; Japan Patent Office; 3-4-3 Kasumigaseki, Chiyoda-ku, Tokyo 100-8915, Japan.

English Translation of Decision of Refusal in Japanese Patent Application No. 2021-534371; pp. 1-4; Mar. 27, 2024; Japan Patent Office; 3-4-3 Kasumigaseki, Chiyoda-ku, Tokyo 100-8915, Japan.

Kajita, S.; Notice of Reasons for Refusal of Japanese Patent Application No. 2021-534371; pp. 1-3; Aug. 23, 2023; Japan Patent Office, 3-4-3 Kasumigaseki, Chiyoda-ku, Tokyo, 100-8915, Japan.

Kajita, S.; Notice of Reasons for Refusal of Japanese Patent Application No. 2021-534371 (English Translation); pp. 1-5; Aug. 23, 2023; Japan Patent Office, 3-4-3 Kasumigaseki, Chiyoda-ku, Tokyo, 100-8915, Japan.

First Office Action in Application No. 202080010854.1; pp. 1-11; Sep. 4, 2024; China National Intellectual Property Administration; No. 6 Xitucheng Road, Haidian District, Beijing, P.R.China 100088.

English Translation of First Office Action in Application No. 202080010854.1; pp. 1-12; Sep. 4, 2024; China National Intellectual Property Administration; No. 6 Xitucheng Road, Haidian District, Beijing, P.R.China 100088.

* cited by examiner

VEHICLE TARGET WITH PANELS FOR AVOIDING RADAR REFLECTIONS INSIDE THE CAR TARGET

This application claims the benefit of the filing date of the International Patent Application No. PCT/EP2020/055470 filed 2 Mar. 2020, which claims priority of the U.S. Provisional Application No. 62/813,316 with filing date of 4 Mar. 2019, the disclosure of which is hereby incorporated herein by reference.

TECHNICAL FIELD

Embodiments of the present invention relate to a vehicle target for testing sensors of vehicle driver assistant systems. Furthermore, embodiments of the present invention relate to a method for manufacturing a vehicle target for testing sensors of vehicle driver assistant systems.

TECHNOLOGICAL BACKGROUND

Crash-objects like vehicle targets for testing sensors of vehicle driver assistant systems are usually very light weight and have a hollow structure with an inner volume. The vehicle targets are movable and cross a predefined path of a vehicle comprising the driver assistance systems to be tested. The vehicle targets are mounted to a drivable platform by a support structure which is arranged in the space between the bottom surface of the vehicle target and the surface of the platform. Hence, there is no free space between the bottom of the vehicle target and the surface of the drivable platform. However, in contrast to this, a real vehicle is arranged on the street by wheels, wherein between the wheels, the bottom of the vehicle and the streets, as free area is provided.

To avoid that e.g. radar-sensor of sensor systems of vehicle driver assistant systems are confused by the design of the vehicle target and specifically by internal reflection of waves, in particular optical and/or radar waves, inside a vehicle target coming from the hollow structure of the vehicle target, the lower part/bottom area of the vehicle target is covered by e.g. a plate like element/panel comprising a radar absorbing or reflecting material/layer.

However, because there is no free space anymore between the bottom and the street or platform of the vehicle target the shape of the shadow of body parts of the target vehicle differ to a real vehicle. Hence, sensor systems of vehicle driver assistant systems could be confused.

SUMMARY

Hence, there may be a need to provide a more realistic vehicle target for testing driver assistance systems.

This need is met for example by a vehicle target for testing sensors of vehicle driver assistance systems and a respective method of producing a vehicle target according to the independent claims.

According to a first aspect of the present invention, a vehicle target for testing sensors of vehicle driver assistant systems is provided. The vehicle target comprises an outer skin defining the outer geometry of the vehicle target, wherein the outer skin at least partially surrounds an inner volume. the legal target further comprises at least one panel comprising a basic body and a radar absorbing or reflecting layer attached to the basic body. The panel is mounted to the outer skin such that at least the radar absorbing or reflecting material/layer has an offset with respect to the outer skin in the direction to the inner volume.

According to a further aspect, a method of manufacturing the above-described vehicle target is provided.

The vehicle target comprises the outer skin defining the outer geometry of the vehicle target. The skin defines the outer shell of the vehicle target. The outer skin may be made of several self-carrying foam panels which are mounted together for forming the desired shape and design of the outer skin representing for example a car. The vehicle target is arranged onto a movable bottom platform which is configured for being driven along the ground. Between the bottom platform and the bottom side of the vehicle target, the panel may be arranged between for example a front wheel section and a rear wheel section.

The outer skin further comprises for example transparent sections for simulating windows of the car or a light of the car. Furthermore, the outer skin may comprise a wheel section simulating a real wheel of the car. The real section may simply optically show a non-rotating wheel. For example, the wheel section may be generated by painting or by stickers glued onto the outer surface of the outer skin. Between the wheel section and the surrounding part, of the outer skin, a gap may be formed by e.g. a groove, wherein along the outer circumference a wheel arch may be simulated, for example by paint, stickers or by additional foam elements. For example, additional elements, such as reflectors simulating lights of the vehicle may be arranged to the outer skin. The outer skin may be mounted to an inner supporting structure which comprises for example beams that are mounted onto the drivable platform.

The panel comprises a basic body to which a radar absorbing or reflecting layer is attached. If the layer is made of an absorbing material, radar waves can be absorbed. Hence it can be assured, that no radar waves are reflected for example by an inner supporting structure of the vehicle target which fixes the vehicle target to a platform or the like. For example, if no panel or a transmissive panel would be used below the outer skin, radar waves would radiate below the outer skin and would be reflected by elements, such as the supporting structure, in the inner volume, which would cause a measurement of the respective sensors of the driver assistant system.

However, if the layer comprises a reflecting material, a predefined reflection direction can be controlled by the alignment of the panel. For example, the panel may be adjusted such that radar waves would not be reflected 180° such that although the radar waves are reflected, no error measurements are caused.

Hence, by the panel, a reflection of radar waves reflected from a structure below the vehicle target to the radar sensors can be reduced or prevented. Hence, although supporting structures and the like are arranged below the vehicle target, a free space below the vehicle target can be simulated for the radar sensors, such that a simulation of a real vehicle having a free space below its bottom is possible.

The radar absorbing material may be made of foam materials in particular without a homogeneous surface. For example, the foam materials may have surface with a nub structure. Furthermore, the absorbing material may be made of polymer material comprising electrically conductive particles, such as electrically conductive carbon or soot particles. Specifically, the absorbing material may have destructive interference characteristics.

The radar reflecting material may have an electrically conductive surface which support the reflection characteristic for in particular radar waves.

The basic body forms the supporting structure for the radar absorbing or reflecting layer. The basic body may be formed of hard foam and comprises for example a coupling element for being coupled to the outer skin of the vehicle target. Specifically, below the front bumper and below the rear bumper respective panels are arranged. Additionally, behind the wheel sections respective panels may be arranged.

According to embodiments of the present invention, the panel comprises an offset in the direction to the inner volume of the vehicle target and the outer skin, respectively. The offset defines a distance between the panel and an outer contour of the outer skin, respectively. Specifically, the panel is distanced and spaced apart to the edges of the outer skin. The offset specifically defines the distance between an edge of the panel which is in contact with the outer skin and an edge of the outer skin from which the bottom surface and a side surface of the outer skin extend.

Hence, the shape of the shadow generated by the outer skin including its edge is not influenced by the panel, because the panel is located further inside and spaced apart from the edge. Hence, the confusion of optical sensors of the driver assistance system between the real vehicle and a car/target according to embodiments of the present invention is reduced, since no artificial shadow is generated by the radar absorbing or reflecting panels.

Accordingly, to provide and display the natural shadow of the vehicle target, which is important for sensors to be tested, e.g. camera sensors, radar sensor, etc., the outer side/outer edges of the panel may have a geometrical offset from the outer skin in direction to the interior volume of the vehicle target with respect to the other exterior surfaces (doors, mud guards, front, and rear bumper). Hence, no edges or other parts of the panel protrude from the outer geometry (e.g. the skin and the other exterior surfaces, such as reflectors) of the vehicle target, so that natural shadow of the vehicle target 100 is not influenced by the panels.

According to further exemplary embodiment, at least two panels are pivotally coupled together. in other words, the vehicle target comprises a further panel which is pivotably coupled to the panel, for example by a hinge. The further panel may also comprise a radar reflective or absorbing layer arranged on a further basic body. Hence, in case of a deformation of the outer skin due to a crash, the panels may pivot around the hinge in order to prevent deformation of the panels.

According to further exemplary embodiment, at least two panels are detachably coupled together by respective detachable fixing elements, such as hook-and-loop fasteners, zip fasteners and/or screw connections.

According to further exemplary embodiment. the panel is detachably coupled to the outer skin or an inner support structure of the vehicle target by respective detachable fixing elements, such as hook-and-loop fasteners, zip fasteners and/or screw connections.

Additionally or alternatively, the panels may be coupled to the outer skin or an inner support structure of the vehicle target by elastic elements, such as elastically deformable belts or strips (e.g. rubber straps). The elastic elements may be coupled to the panel and the outer skin or support structure of the vehicle target in such a way that upon an impact of the vehicle target with a further subject (such as a vehicle to be tested) the elastic elements still connect the panels to the vehicle target. Hence, if for example the detachable fixing elements, such as the hook-and-loop fasteners, release the panels from the outer skin upon impact, the elastic elements still hold the panels in the vicinity of the vehicle target. Hence, a faster reassembly of the vehicle target after a crash may be provided since the detached panels are still in the vicinity of the vehicle target.

According to further exemplary embodiment, the basic body is, at least partially, transparent for waves, in particular optical and/or radar waves.

According to further exemplary embodiment an outer surface of the panel is wave shaped. Hence, the risk of a direct reflection of radar waves which may cause an error measurement of the radar sensors may be reduced. Additionally, or alternatively, the outer surface of the panel may have a plurality of protrusions and grooves or holes in order to reduce the risk of direct reflection of radar waves to the respective sensors. Hence, the outer surface of the panel may not be a plain surface to reduce optical reflections.

According to further exemplary embodiment, are outer surface of the panel directing to the environment of the vehicle target has a grey and/or mat color. hence, in particular reflection of optical waves may be reduced in order to reduce the risk of an error measurement of optical sensors of the driver assistant system may be reduced.

According to further exemplary embodiment, the radar absorbing or reflecting material/layer is arranged to the basic body of the panel at inner surfaces of the basic body directing to the inner volume. In particular the inner surfaces are opposite surfaces with respect to the outer surface. Specifically, the inner surface of the basic body comprises a normal which directs into the inner volume of the outer skin. The radar absorbing or reflecting material is located at the inner side (i.e. the inner surface) of the panels and the basic body, respectively. Specifically, the panels comprise a basic body being transparent for waves 111, particular optical and/or radar waves. To the inner surface of the basic body, the layer of radar absorbing or reflecting material 105 is arranged.

According to further exemplary embodiment, the basic body comprises a side surface connecting the inner surface with the outer surface of the basic body, wherein the radar absorbing or reflecting material/layer is arranged onto the side surface of the basic body. Hence, a more comprehensive reflection or absorbing of the radar waves is provided.

According to a further exemplary embodiment, the absorbing/reflecting layer extends non-parallel with respect to a vertical direction. In other words, the absorbing/reflecting layer comprises a normal which is non-perpendicular to a horizontal direction. In other words, the vehicle target is arrangeable onto a supporting plane which is generally parallel to the horizontal plane. A normal of the supporting plane may be parallel to a vertical direction.

According to further exemplary embodiment, the outer skin comprises a wheel section which comprises an optical representation of a real wheel, wherein the outer skin comprises a gap around the wheel section for representation of a wheel arch. The panel is mounted in the gap to the wheel section and/or to an inner surface of the outer skin opposite to the wheel section. the offset of the panel mounted to the wheel section may be determined by the distance between a front edge of the outer skin to the panel arranged to the front wheel section and/or by a distance between the rear edge of the outer skin to the panel arranged to the rear wheel section.

According to further exemplary embodiment, the panel is arranged to a bottom surface of the vehicle target and extends between two opposing sides of the vehicle target. The panel may extend between a front end and a rear end of the vehicle target, wherein the panel may be spaced by the offset from a front edge and a rear edge of the vehicle target and the outer skin, respectively. Furthermore, the panel may extend between two side surfaces (i.e. left and right side) of the vehicle target and the outer skin, respectively. Specifically, the panel may extend between a front wheel section and a rear wheel section or between a right wheel section and a left rear section of the outer skin. Hence, radar waves arriving to a space below the vehicle target from the front or the side of the vehicle target can be absorbed or reflected in a desired direction, such that error measurements can be reduced.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

DETAILED DESCRIPTION OF EXEMPLARY EMBODIMENTS

The illustrations in the drawings are schematic. It is noted that in different figures similar or identical elements are provided with the same reference signs.

Figure 1:
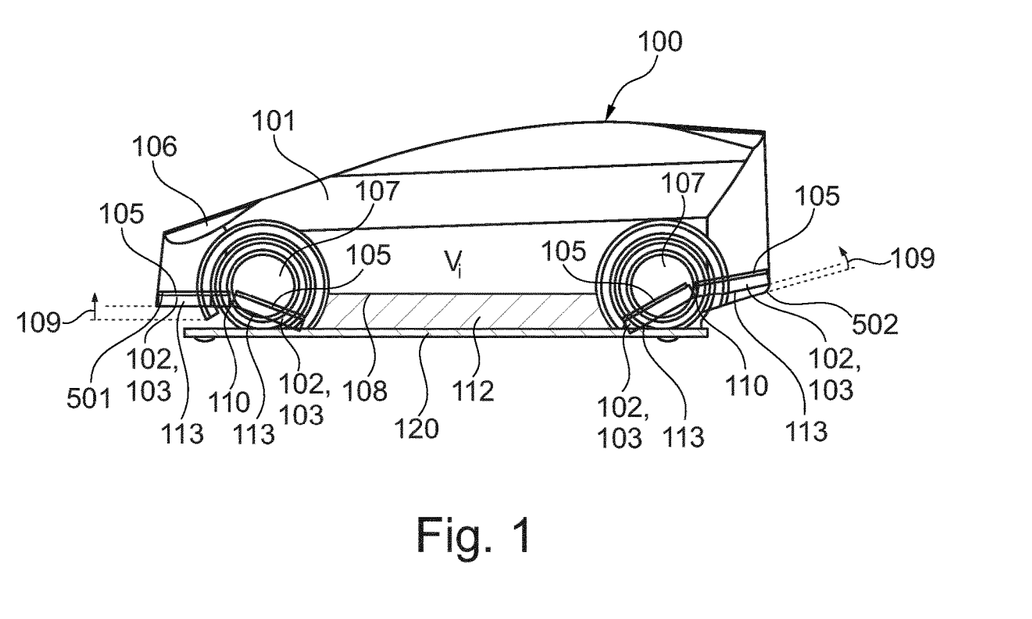
FIG. 1 to 4 show exemplary embodiments of the car target according to the embodiments of the present invention.

FIG. 1 shows a side view of a vehicle target 100 according to an exemplary embodiment of the invention.

The vehicle target 100 is provided for testing sensors of vehicle driver assistant systems. The vehicle target 100 comprises an outer skin 101 defining the outer geometry of the vehicle target 100, wherein the outer skin 101 at least partially surrounds an inner volume Vi. The vehicle target 100 further comprises at least one panel 102, 112 comprising a basic body 103 and a radar absorbing or reflecting layer 105 attached to the basic body 103, wherein the panel 102, 112 is mounted to the outer skin 101 such that at least the radar absorbing or reflecting material/layer 105 has an offset 109 with respect to the outer skin 101 in the direction to the inner volume Vi.

The vehicle target 100 comprises an outer skin 100 defining the outer geometry of the vehicle target. For example, additional elements, such as reflectors 106 may be arranged to the outer skin 101 for defining the outer geometry. Additionally wheels 107 may be formed to the outer skin 100.

The skin 101 defines the outer shell of the vehicle target 100. The panel 102, 112 comprise an offset 109 in the direction to the inner volume vi of the vehicle target 100. The offset 109 defines a distance between the panel 102, 112 and an outer contour of the outer skin 101, respectively. Specifically, the panel 102, 112 flushing with the edges of the outer skin 101. So that the offset 109 may be small.

Specifically, below the front bumper and below the rear bumper respective panels 102 are arranged. Additionally behind the wheels 107 respective panels 102 may be arranged. Additionally, two panels 102 may be flexibly mounted together by hinges 110. Hence, in case of a deformation of the outer skin 101 due to a crash, the panels 102 may pivot around the hinge 110 in order to prevent deformation of the panels 102.

The vehicle target 101 is arranged onto a bottom platform 120 which is configured for being driven along the ground. Between the bottom platform 120 and the bottom side of the vehicle target 100, the panel 112 is arranged between the front wheel and the rear wheel 107.

To provide and display the natural shadow of the vehicle target 100, which is important for sensors to be tested, e.g. camera sensors, radar sensor, etc., the outer side/outer edges of the panel 102 may have a geometrical offset 109 from the outer skin 101 in direction to the interior volume Vi of the vehicle target 100 with respect to the other exterior surfaces (doors, mud guards, front, and rear bumper). Hence, no edges or other parts of the panel 102, 112 protrude from the outer geometry (e.g. the skin 101 and the other exterior surfaces, such as reflectors 106) of the vehicle target 100, so that natural shadow of the vehicle target 100 is not influenced by the panels 102.

Additionally the outer surface 113 of the panel 102, 112 may not be a plain surface to avoid optical reflections. Preferably, the outer surface 113 of the panel is wave-shaped and has a grey/mat color.

The radar absorbing or reflecting material 105 is located at the inner side (i.e. the inner surface) of the optical panels 102, 112.

Specifically, the panels 102, 112 comprise a basic body 103 being transparent for waves 111, particular optical and/or radar waves. To the inner surface of the basic body 103, the layer of radar absorbing or reflecting material 105 is arranged.

The panel 102, 112 comprises a basic body 103 to which a radar absorbing or reflecting layer 105 is attached. The basic body 103 forms the supporting structure for the radar absorbing or reflecting layer 105. The panels 102, 112 comprise offsets in the direction to the inner volume vi of the vehicle target 100 and the outer skin 101, respectively. The offset 109 defines a distance between the panel 102, 112 and an outer contour of the outer skin 101, respectively. Specifically, the panel 102, 112 is distanced and spaced apart to the edges 501, 502 of the outer skin 101. The offset 109 specifically defines the distance between an edge of the panel 102, 112 at the contact position with the outer skin 101 and an edge 5001, 502 of the outer skin 101 from which the bottom surface and a side surface of the outer skin 101 extend.

As can be taken from FIG. 1, the panel 112 extends from the front to the back of the vehicle target 100. Hence, the panels 102, 112 covers the space between a platform 120 and the bottom of the outer skin 101. The panel 112 has an offset 109 (not shown for panel 120) in the plane of projection and has a respective offset 109 from the side wall of the outer skin 101. Accordingly, panel 112 is arranged further inside and behind the respective wheel sections 107. A perspective view of the panel 112 can be taken from FIG. 3.

Accordingly, the panel 102 provides a respective offset 109 with respect to the side wall of the outer skin 101. Additionally, the panels 102 comprising offset 109 from the bottom surface of the outer skin 101 as shown in FIG. 1. the panels 102 are arranged at an inner side of the outer skin 101 and/or with an offset 109 above the bottom edge 108 of the outer skin 101. Specifically, the panels 102 extend between the inner sides of opposing front wheel sections 107 or opposing rear wheel sections 107, respectively.

As can be taken by the front and rear panels 102, at least two panel parts are pivotably coupled together. The two panel parts are pivotably coupled by a hinge 110. Hence, in case of a deformation of the outer skin 101 due to a crash, the panel parts may pivot around the hinge 110 in order to prevent deformation of the panel parts.

The radar absorbing or reflecting material/layer 105 is arranged to the basic body 103 of the panel 102, 112 at inner surfaces 114 of the basic body 103 directing to the inner volume vi. In particular, the inner surfaces 114 are the opposite surfaces with respect to the outer surface 113. Specifically, the inner surface 114 of the basic body 103 comprises a normal which directs into the inner volume vi of the outer skin 101. The radar absorbing or reflecting material 105 is located at the inner side 114 (i.e. the inner surface) of the basic body 103. Specifically, the basic body 103 may be transparent for waves 111, particular optical and/or radar waves.

Figure 2:
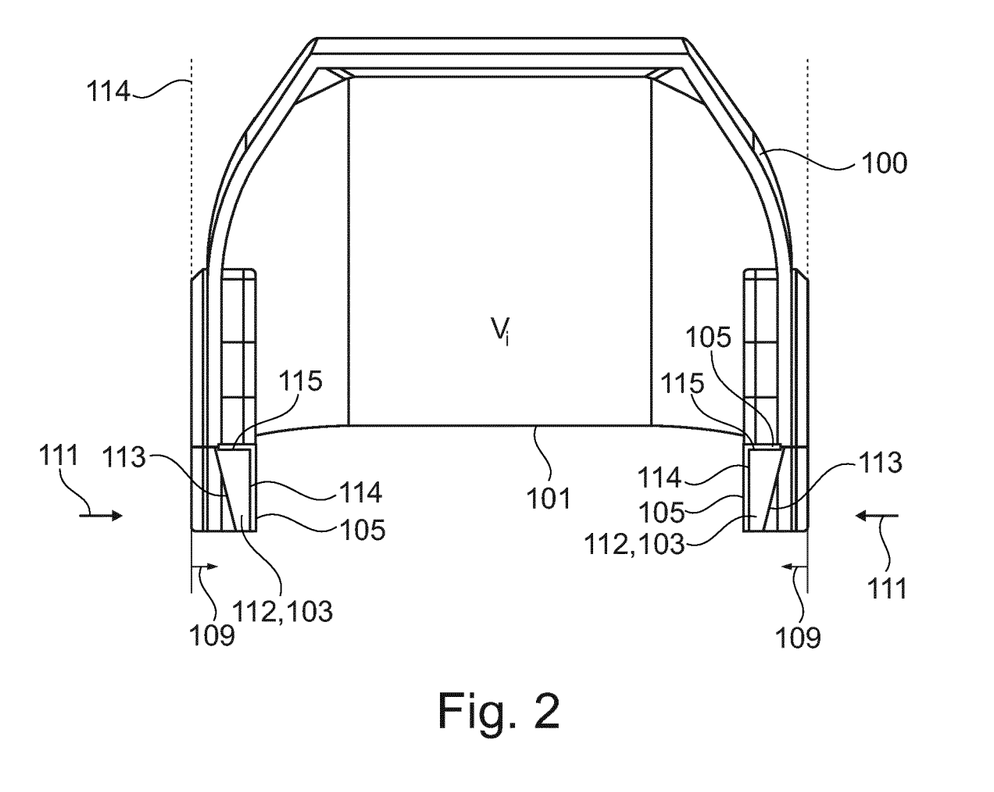

As can be seen in FIG. 2, the panel 112, the panel 112 comprise an (e.g. vertical) offset 109 from the side surface of the vehicle target 100.

As can be further taken by the panel 112 in FIG. 2, the panels 102, 112 may have a basic body having a trapezoid or almost triangular cross-section. Along to side surfaces of the panels 102, 112, which side surfaces direct to the inner volume Vi of the vehicle target 100, respective radar absorbing or reflecting material/layers 105 are arranged. Hence, radar waves 111 are prevented from entering the inner volume Vi.

Specifically, the basic body 113 may have a wedge-shaped cross-section, wherein the tip of the wedge-shaped cross-section is spaced apart from the bottom of the outer skin 101 and the larger side surface 115 is coupled for example to the outer skin 101 or a bottom structure of the vehicle target 100. Specifically, between the side surface 115 of the basic body 103 and the outer skin 101, a section of the radar absorbing or reflecting layer 105 may be arranged. Furthermore, further part of the radar absorbing or reflecting layer 105 is attached on the inner surface 114 of the basic body 103. As illustrated by the arrow 111, radar waves radiating below the outer skin 101 are affected (reflected or absorbed) by the panel 112, so that an error measurement of the sensors of a vehicle driver assistant system can be prevented.

Figure 3:
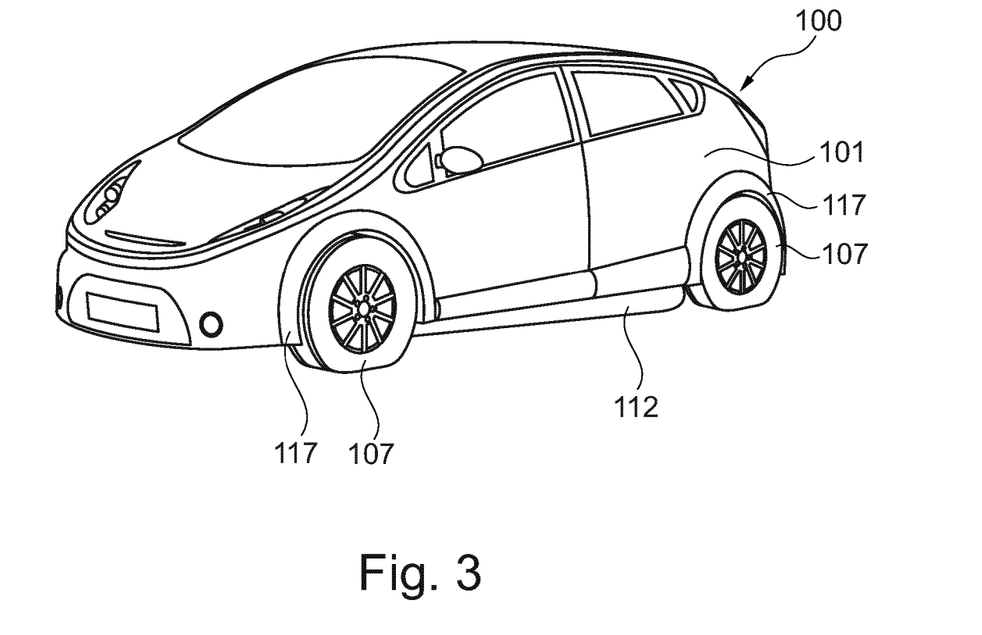

As can be taken from FIG. 3, the panel 112 is offset from the outer skin 101 in the direction to the in the volume Vi of the vehicle target 100. Hence, as can be taken from FIG. 3, the shadow of the vehicle target 100 is not affected by the panel 112.

Hence, the shape of the shadow generated by the outer skin 101 including its edges is not influenced by the panels 112, because the panel 112 is located further inside and spaced apart from the edge. Hence, the confusion of optical sensors of the driver assistant system between the real vehicle and a car/vehicle target according to embodiments of the present invention is reduced, since no artificial shadow is generated by the radar absorbing or reflecting panels 112.

Figure 4:
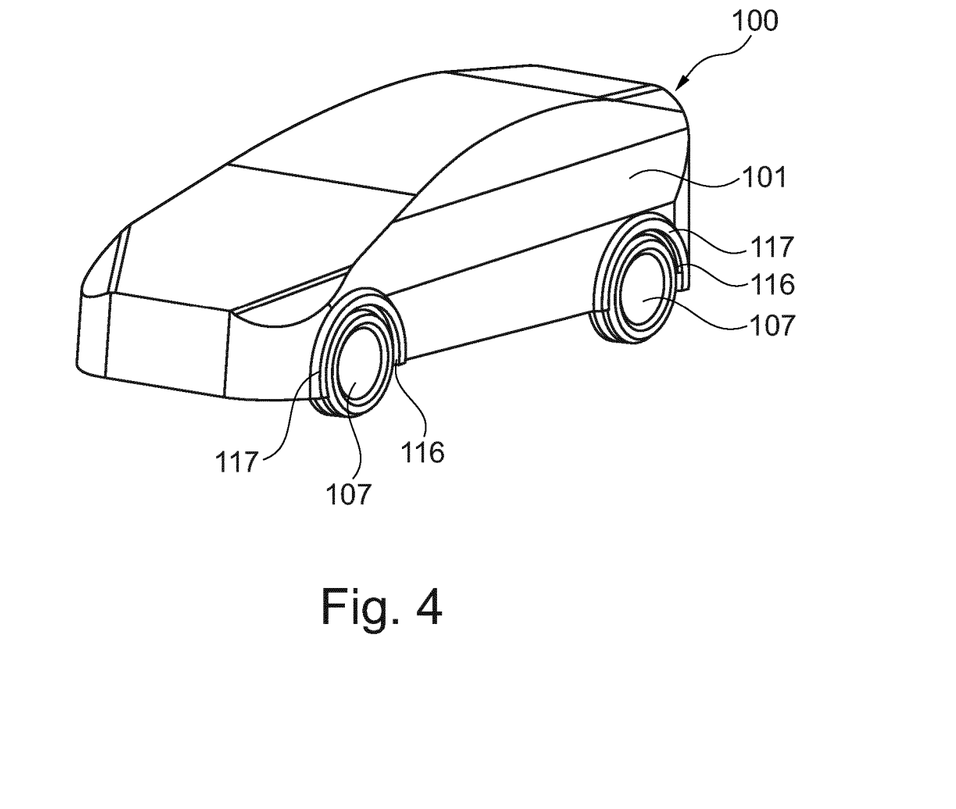

FIG. 4 illustrates a schematic view of a vehicle target 100 comprising the outer skin 101. As can be taken from FIG. 4 the outer skin 101 may additionally comprise wheel sections 107 which simulates a real wheel of a real vehicle. However, the wheel sections 107 may be not rotatable in comparison to a real wheel. The wheel section 107 may be formed by a sticker which is glued onto a skin surface of the outer skin 101 or by a specific paint layer. Furthermore, a wheel arch 117 may be formed. Between the real section 107 and the wheel arch 117, a gap or groove 116 may be formed inside the outer skin 101.

Figure 5:
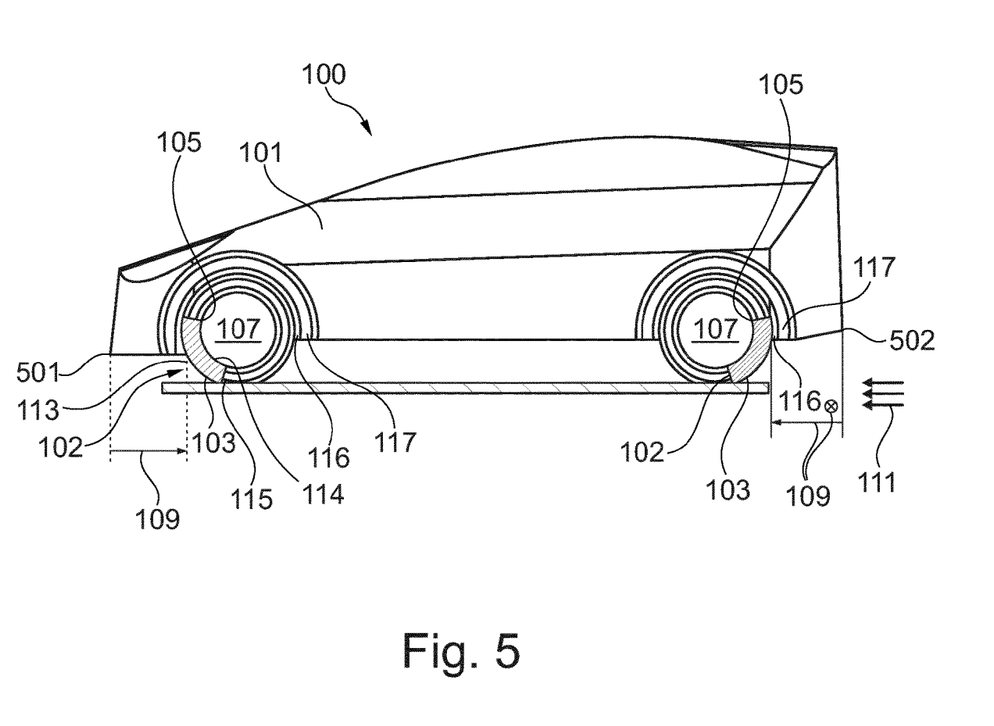
FIG. 5 show a schematic view of a vehicle target having panels on wheel sections according to an exemplary embodiment of the present invention.

FIG. 5 shows a schematic view of a vehicle target 100 having panels 102 on wheel sections 107 according to an exemplary embodiment of the present invention. The outer skin 101 comprises a wheel section 107 which comprises an optical representation of a real wheel, wherein the outer skin 101 comprises a gap 116 around the wheel section 107 for representation of a wheel arch 117. The panel 102 is mounted in the gap 116 to the wheel section 107 and/or to an inner surface of the outer skin 101 opposite to the wheel section 107. the offset 109 of the panel 102 mounted to the wheel section 107 may be determined by the distance between a front edge 501 of the outer skin 101 to the panel 102 arranged to the front wheel section 107 and/or by a distance between the rear edge 502 of the outer skin 101 to the panel 102 arranged to the rear wheel section 107.

The basic body 103 comprises a side surface 115 connecting the inner surface 114 with the outer surface 113 of the basic body 103, wherein the radar absorbing or reflecting material/layer 105 is arranged onto the side surface 115 of the basic body 103. Hence, a more comprehensive reflection or absorbing of the radar waves is provided.

Specifically, the panel 102 is arranged to an interior side of the wheel section 107 and extends for example between two opposing wheel sections 107. Hence, the panel 102 has an offset 109 from the front or rear edge 501, 502 and a further offset 109 from a side surface of the outer skin 101. Hence, radar waves 111 which radiates from the backside or the front side of the vehicle target 100 below the outer skin 101 can be absorbed or reflected by the panel 102. Furthermore, the panel may have a curved shape which can be adapted to the circumferential extension and (bending) radius, respectively, of the wheel section 107.

Figure 6:
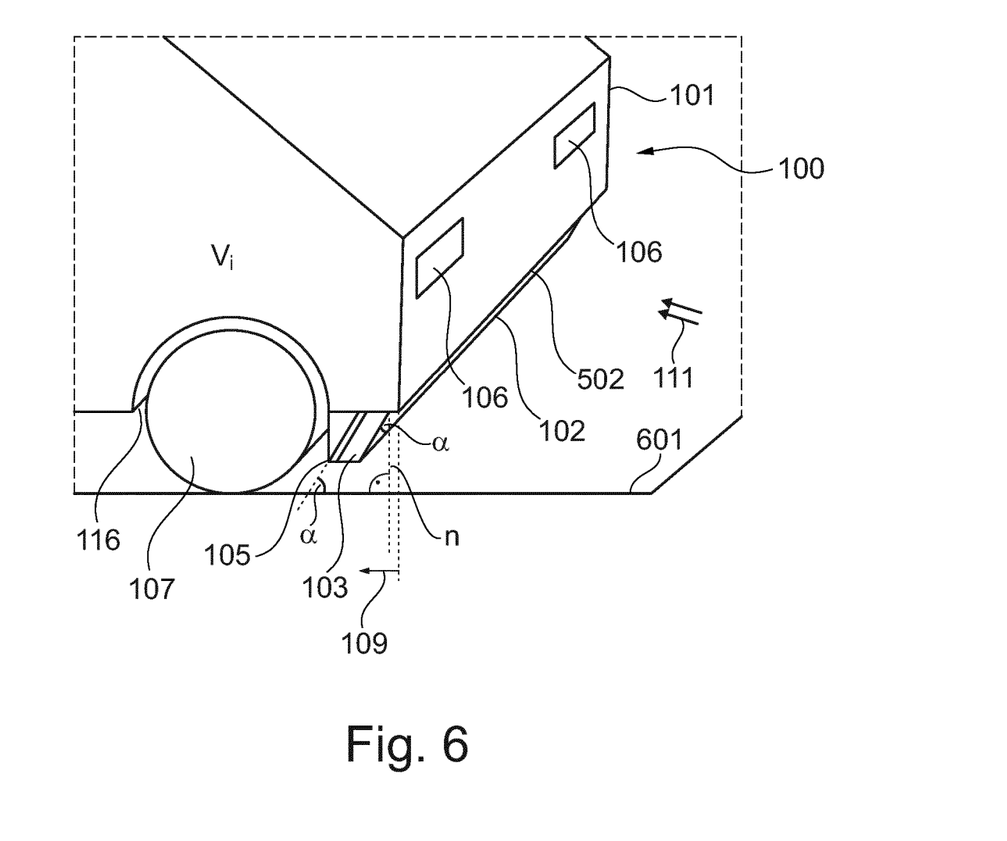
FIG. 6 shows a schematic view of a back side of a vehicle target according to an exemplary embodiment of the present invention.

FIG. 6 shows a schematic view of a back side of a vehicle target 100 according to an exemplary embodiment of the present invention. The absorbing/reflecting layer 105 extends non-parallel with respect to a vertical direction. In other words, the absorbing/reflecting layer 105 comprise a normal which is non-perpendicular to a horizontal direction. In other words, the vehicle target 100 is arrangeable onto a supporting plane 601 which is generally parallel to the horizontal plane. A normal n of the supporting plane 601 may be parallel to a vertical direction. In other words, the absorbing/reflecting layer 105 may have an angle α between 1° and 89° to the normal n of the supporting plane 601. Furthermore, the panel 102 extends from the edge 502 of the for outer skin 101 in the direction to the supporting plane 601 and further along a vertical direction to the inner volume vi. Hence, radar waves 111 directed to the panel 102 are reflected in the direction to the supporting claim 601.

Specifically, the panel 102 is arranged to a bottom surface of the vehicle target 100 and extends for example between two opposing sides of the vehicle target 100. Hence, the panel 102 has an offset 109 from the rear edge 502 and a further offset 109 from a side surface of the outer skin 101. Hence, radar waves 111 which radiate from the backside of the vehicle target 100 below the outer skin 101 and the vehicle target 100, respectively, can be absorbed or reflected by the panel 102. The panel 102 can be formed similar to the panel 102 shown in FIG. 5.

It should be noted that the term "comprising" does not exclude other elements or steps and "a" or "an" does not exclude a plurality. Also elements described in association with different embodiments may be combined. It should also

REFERENCE NUMERALS 100 car target
101 skin
102 panel
103 basic body
105 radar absorbing car reflecting material/layer
106 reflector
107 wheel, wheel section
108 lower part of vehicle target, bottom edge
109 offset
110 hinge
111 waves, particular optical and/or radar waves
112 further panel
113 outer surface of panel
114 inner surface of panel
115 side surface of panel
116 gap
117 wheel arch
120 driven platform
501 front edge
502 rear edge
601 supporting plane

The invention claimed is:

1. A vehicle target for testing sensors of vehicle driver assistant systems, the vehicle target comprising:
an outer skin defining an outer geometry of the vehicle target, wherein the outer skin at least partially surrounds an inner volume,
at least one panel comprising a basic body and a radar absorbing or reflecting layer attached to the basic body,
wherein the at least one panel is mounted to the outer skin such that the radar absorbing or reflecting layer has an offset with respect to the outer skin in a direction to the inner volume,
wherein an outer surface of the at least one panel is arranged with structures configured to reduce reflection of radar waves.

2. The vehicle target according to claim 1, wherein at least two panels are pivotally coupled together.

3. The vehicle target according to claim 1, wherein at least two panels are detachably coupled together by respective detachable fixing elements selected from the group consisting of hook-and-loop fasteners, zip fasteners and screw connections.

4. The vehicle target according to claim 1, wherein the at least one panel is detachably coupled to the outer skin or an inner support structure of the vehicle target by respective detachable fixing elements selected from the group consisting of hook-and-loop fasteners, zip fasteners and screw connections.

5. The vehicle target according to claim 1, wherein the basic body is at least partially transparent to optical and/or radar waves.

6. The vehicle target according to claim 1, wherein an outer surface of the at least one panel is wave shaped.

7. The vehicle target according to claim 1, wherein an outer surface directing to the environment surrounding the vehicle target has a grey and/or mat color.

8. The vehicle target according to claim 1, wherein the surfaces of the basic body facing the inner volume are opposed to the outer skin.

9. The vehicle target according to claim 8, wherein the basic body comprises a side surface connecting the inner surface with an outer surface of the basic body,
wherein the radar absorbing or reflecting layer is arranged on the side surface of the basic body.

10. The vehicle target according to claim 1, wherein the radar absorbing or reflecting layer extends non-parallel with respect to a vertical direction.

11. The vehicle target according to claim 1, wherein the outer skin comprises a wheel section which comprises an optical representation of a wheel,
wherein the outer skin comprises a gap around the wheel section for representation of a wheel arch, and
wherein the at least one panel is mounted in the gap around the wheel section, and/or to an inner surface of the outer skin opposite to the wheel section.

12. The vehicle target according to claim 1, wherein the panel is arranged to a bottom surface of the vehicle target and extends between two opposing sides of the vehicle target.

13. The vehicle target according to claim 1, wherein the structures are selected from the group consisting of protrusions, grooves, and holes.

14. The vehicle target according to claim 1, wherein the outer surface is not a plain surface to reduce optical reflections.

15. A method of manufacturing a vehicle target for testing sensors of vehicle driver assistant systems, the method comprising:
providing at least one panel comprising a basic body and a radar absorbing or reflecting layer attached to the basic body,
mounting the at least one panel to an outer skin defining an outer geometry of the vehicle target, the outer skin at least partially surrounding an inner volume of the vehicle target, wherein the at least one panel is mounted to the outer skin such that at least the radar absorbing or reflecting layer has an offset with respect to the outer skin in the direction to the inner volume,
wherein an outer surface of the at least one panel is arranged with structures configured to reduce reflection of radar waves.

* * * * *